(12) United States Patent
Schlabach

(10) Patent No.: US 6,546,816 B2
(45) Date of Patent: Apr. 15, 2003

(54) ECCENTRICITY COMPENSATOR WITH LOW HYSTERESIS FOR USE BETWEEN TWO NON-COAXIAL ROTATING SHAFTS

(75) Inventor: Roderic A. Schlabach, Elkhart, IN (US)

(73) Assignee: CTS Corporation, Elkhart, IN (US)

(*) Notice: Subject to any disclaimer, the term of this patent is extended or adjusted under 35 U.S.C. 154(b) by 0 days.

(21) Appl. No.: 09/945,572

(22) Filed: Aug. 31, 2001

(65) Prior Publication Data

US 2003/0041677 A1 Mar. 6, 2003

(51) Int. Cl.[7] ................................................ G01L 3/02
(52) U.S. Cl. .................................. 73/862.326; 464/137
(58) Field of Search .................... 23/862.326, 862.325, 23/862.191, 862.321, 862.324; 464/185, 102, 104, 147, 150, 179, 182, 120, 125, 121, 122, 123, 137, 71, 72

(56) References Cited

U.S. PATENT DOCUMENTS 5,763,793 A * 6/1998 Ng et al. ............... 73/862.326
5,837,908 A  11/1998 Ng
5,934,890 A  8/1999 Mihara
6,190,264 B1 * 2/2001 Al-Rawi ..................... 464/185

FOREIGN PATENT DOCUMENTS

| DE | 3543025 A1 | 7/1986 |
| DE | 19929905 A1 | 1/2001 |
| EP | 0481568 A1 | 4/1992 |

* cited by examiner

Primary Examiner—Hezron Williams
Assistant Examiner—Corey D. Mack
(74) Attorney, Agent, or Firm—Mark P. Bourgeois

(57) ABSTRACT

An eccentricity compensator for preventing wear induced rotational displacement. The eccentricity compensator is mounted between two rotating shafts joined by a torsion bar that have non-coaxial axes of rotation. The compensator includes a first ring attached to a first shaft and a second ring located adjacent the first ring. A third ring is attached to a second shaft and the third ring is located adjacent the second ring. One or more pin-slot pairs are located between any two of the first, second or third rings. A spring is mounted adjacent each pin-slot pair. The spring biases the pin-slot pair such that hysteresis is prevented.

18 Claims, 5 Drawing Sheets

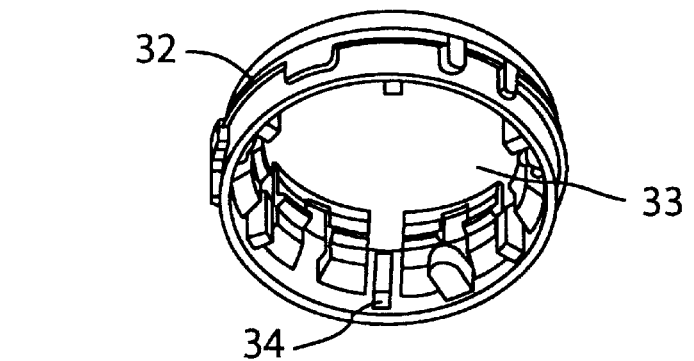
FIG. 3
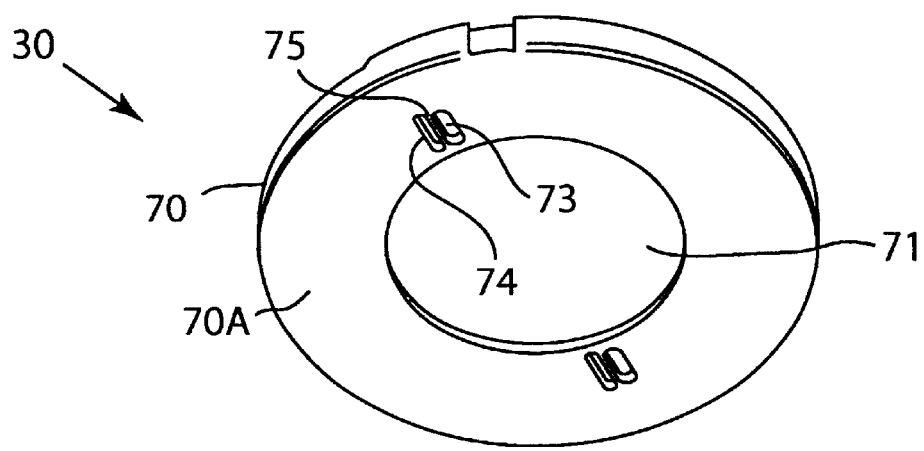
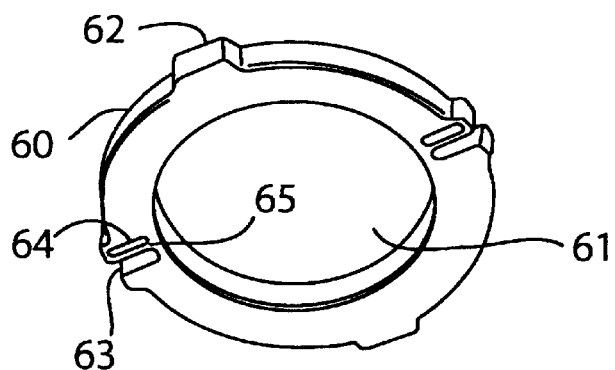
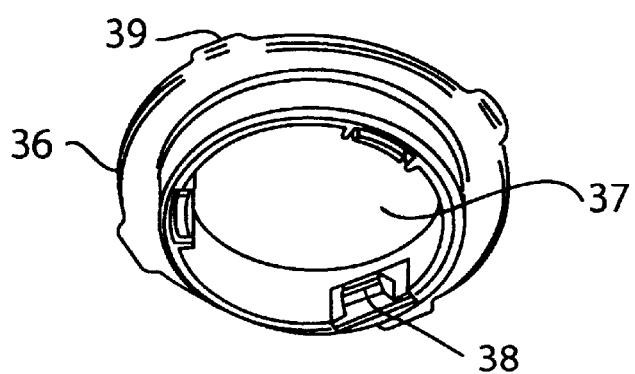

ECCENTRICITY COMPENSATOR WITH LOW HYSTERESIS FOR USE BETWEEN TWO NON-COAXIAL ROTATING SHAFTS

CROSS REFERENCE TO RELATED APPLICATIONS

This application is related to U.S. patent application Ser. No. 09/837,075, filed Apr. 18, 2001 and titled, "Steering Wheel Torque and Position Sensor".

The foregoing patent has the same assignee as the instant application and is herein incorporated by reference in entirety for related and supportive teachings.

BACKGROUND OF THE INVENTION

1. Field of the Invention

This invention relates to steering wheel sensors that are mounted to rotating shafts that are joined by a torsion bar. In particular, there is an eccentricity compensator that prevents hysteresis between the two rotating shafts when their axes of rotation are co-axial or not co-axial.

2. Description of the Related Art

Various devices and methods of dealing with the joining of two shafts that are rotating in a non-coaxial manner are known. These are called eccentricity compensators. One such device is a universal joint or U-joint. The U-joint is a well known device that typically is used to link between a transmission shaft and an axle shaft to allow the shafts angle to bend.

Unfortunately, the prior art devices as they wear out, create what is called hysteresis. Hysteresis is a backlash or slop between the two rotating shafts. While, some hysteresis may be acceptable in a drive shaft application, in an application such as a steering wheel torque sensor this is unacceptable. A steering wheel torque sensor needs to have very precise position information of the relative rotational positions of the two shafts in order to correctly sense the amount of torque applied to the steering wheel. As the sensor wears, there cannot be excessive rotational movement between the two shafts leading to incorrect torque readings. Referring to FIG. 1, part of a prior art eccentricity compensator 10 is shown. Eccentricity compensator 10 is part of a steering wheel torque sensor that is described in U.S. patent application Ser. No. 09/837,075, filed Apr. 18, 2001 and titled, "Steering Wheel Torque and Position Sensor".

The compensator 10 is shown in an assembled partial end view. The compensator 10 has a shaft 11 that is connected to a carrier or ring 14 by splines (not shown). Ring 14 has four pins 16 that extend upwardly. Another ring 12 is mounted adjacent to ring 14. Ring 12 has four slots 18. Pins 16 are located in slots 18. The rings 12, 14 and pins 16 are formed from injection molded plastic. Over a period of time during use, the eccentricity compensator parts will wear. The result is a gap 19 between pin 16 and a side wall 21. When the gaps 19 form in slots 18, the sensor components can rotate or have hysteresis when there is no actual torque in the steering wheel column. The compensator rotates about an axis or rotation 20. When the compensator is new rings 12 and 14 will rotate together in an original position as indicated by line 22. In compensator 10, there may be initial hysteresis due to a gap 19 due to manufacturing tolerances of the pin and slot. After the compensator 10 has had some wear, the positions of ring 12 and 14 will rotate relative to each other. This is indicated by dashed line 24. The rotational difference or error or hysteresis caused by the wear is indicated as a hysteresis angle 26. Angle 26 is very undesirable as it leads to incorrect torque readings.

The automotive industry has been focusing on electrical assist power steering for vehicles. The electrical assist power steering unit is an electrical motor attached to the steering linkage that operates when assist is required. A large amount of torque on the steering wheel occurs at low speed operation or during parking. The electrical assist power steering is generally not needed during high speed operation such as during highway driving. The major advantages of electrical assist power steering are first, that it only operates during the short time of turning and is inoperative the rest of the time and second that it is simpler to manufacture. In a hydraulic power steering system, the power steering pump is always being turned by the engine and represents an energy drain on the motor all the time even though steering is only performed during a small percentage of the total time a car is operated. An electrical assist power steering system requires sensing of torque applied to the steering wheel. The torque indicates how much force the operator is exerting to move the wheel. The output signal from a torque sensor is fed into a control unit which controls the electrical motor of the assist unit. When the torque sensed is high, the assist applied to the steering linkage will be high. When the torque sensed is low, the assist applied to the steering linkage will be low.

In general, a sensor that measures the relative displacement between two rotating shafts has useful applications in the areas of industrial machinery, aerospace, electrical power generation and transportation.

There is a current unmet need for a device that prevents hysteresis between two non-coaxial rotating shafts. Additionally, there is a current unmet need for a eccentricity compensator to prevent hysteresis in a steering wheel column torque sensor.

SUMMARY OF THE INVENTION

It is a feature of the invention to provide a eccentricity compensator that prevents wear induced rotational displacement that is mounted between two rotating shafts that have non-coaxial axes of rotation.

Yet, another feature of the invention is to provide a eccentricity compensator for preventing hysteresis between a first and a second rotating shaft that are joined by a torsion bar. The eccentricity compensator includes a first ring attached to the first shaft and a second ring located adjacent the first ring. A third ring is attached to the second shaft and the third ring is located adjacent the second ring. At least one pin-slot pair is located between any two of the first, second or third rings. A spring is mounted adjacent the pin-slot pair. The spring biases the pin-slot pair such that hysteresis is prevented. The springs and slots are arranged in such a way that wear of the pins in the slots does not result in drift.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention.

BRIEF DESCRIPTION OF THE DRAWINGS

FIG. 3 is another view of FIG. 2 from a different angle.

It is noted that the drawings of the invention are not to scale. In the drawings, like numbering represents like elements between the drawings.

DETAILED DESCRIPTION OF THE PREFERRED EMBODIMENT

Eccentricity Compensator

Figure 1:
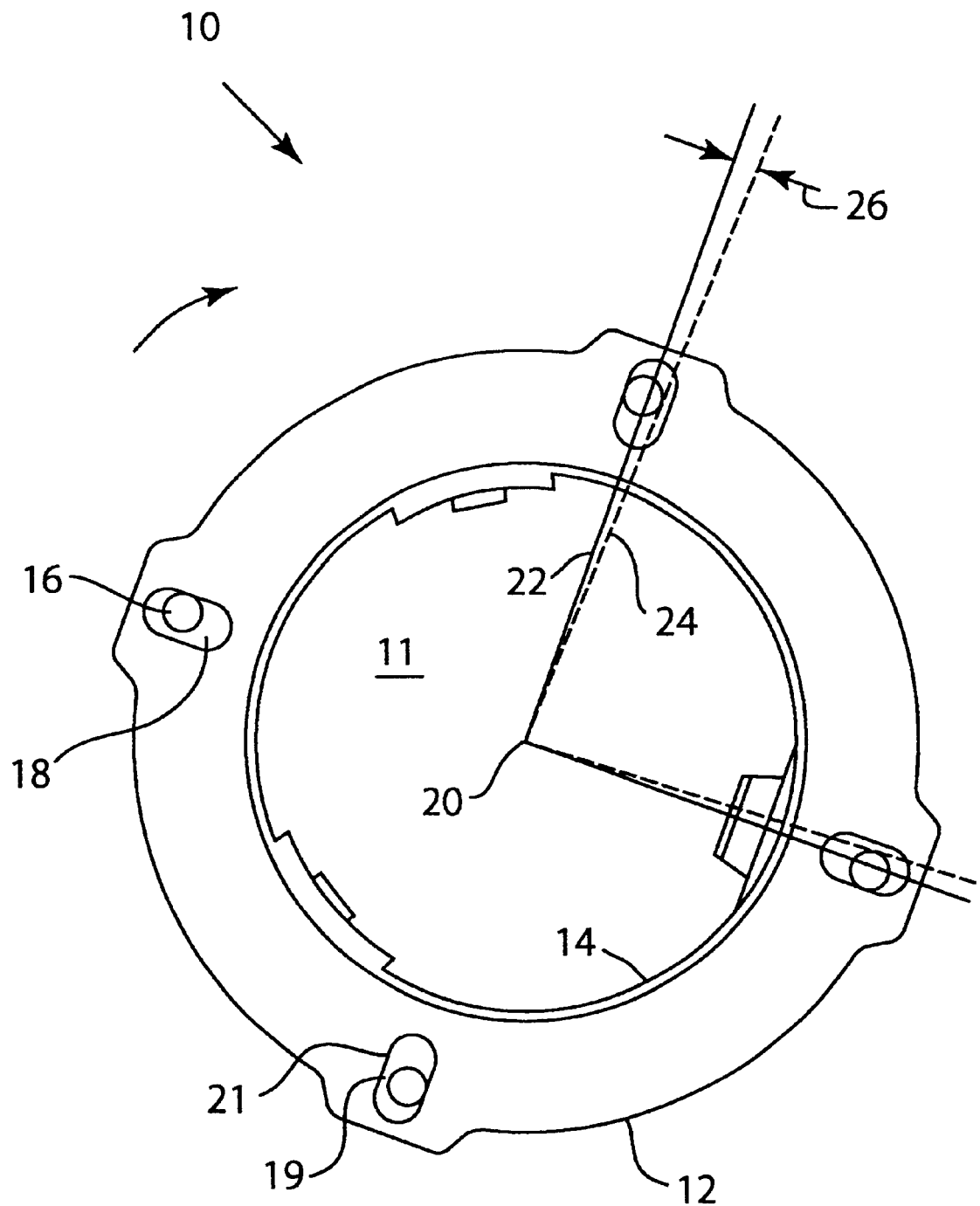
FIG. 1 is an end view of a prior art eccentricity compensator showing the rotational movement that occurs between two shafts as the compensator wears.
Figure 2:
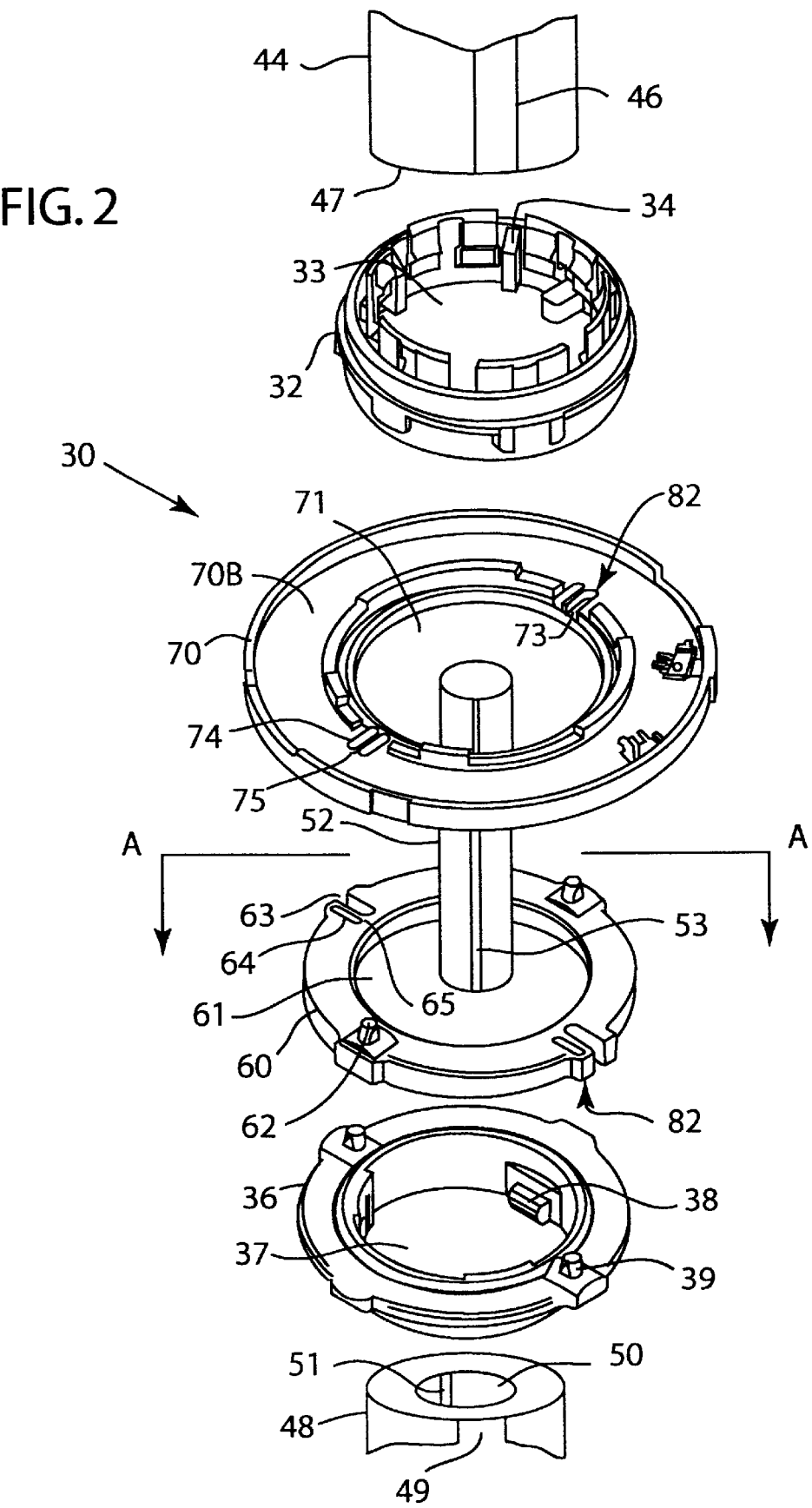
FIG. 2 is a perspective exploded view of the preferred embodiment of an eccentricity compensator that prevents hysteresis used with two rotating shafts in accordance with the present invention.
Figure 4:
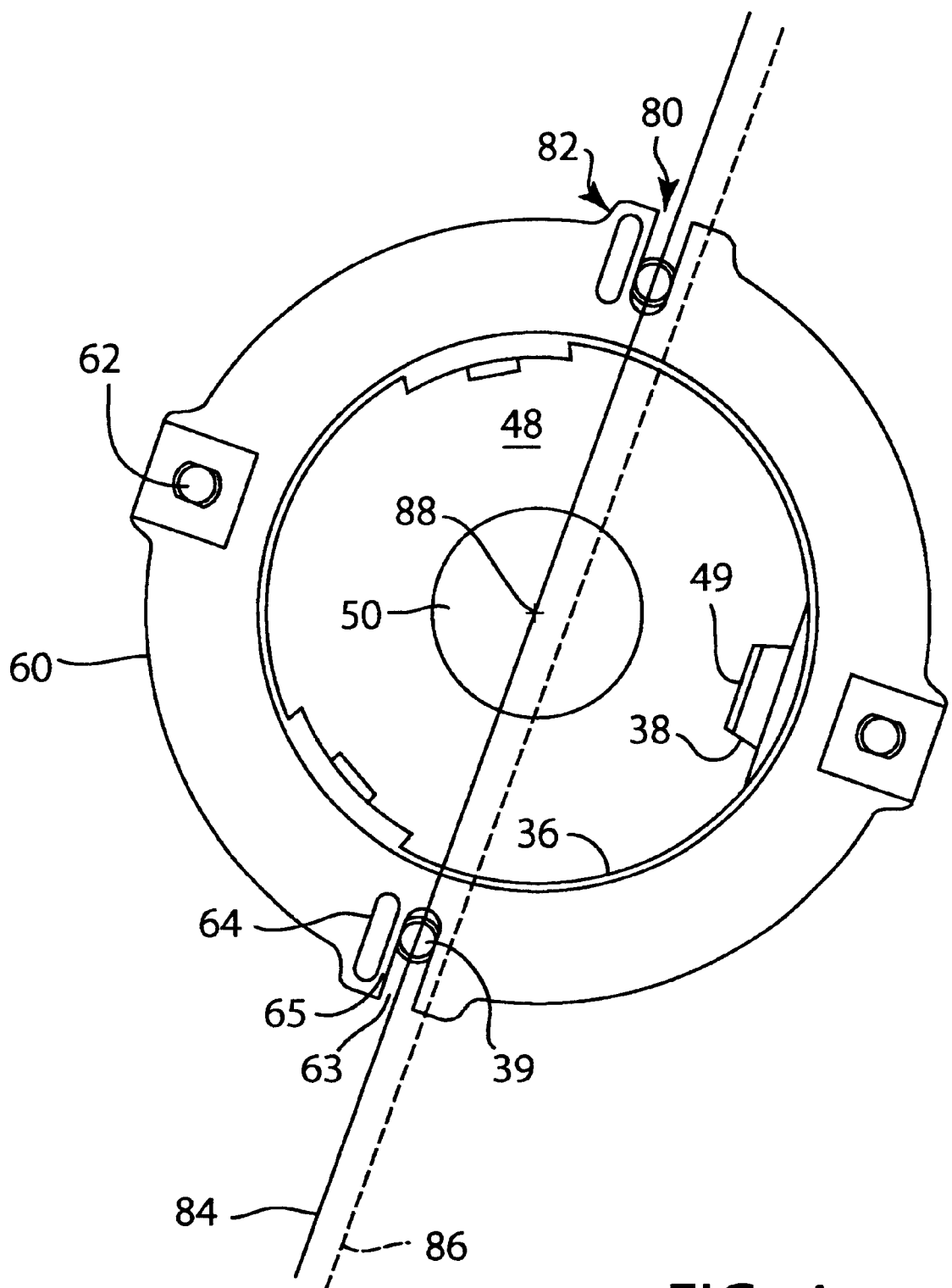
FIG. 4 is an end assembled view along section line A—A of FIG. 2.

Referring to FIGS. 2–4, there is an eccentricity compensator 30 having low hysteresis shown. In particular, eccentricity compensator 30 has a lower carrier or ring 36, a ring 60 and a rotor or ring 70. Lower carrier or ring 36 has a hole 37 and splines 38 that face hole 37. A pair of pins 39 extend from ring 36 toward ring 60. A ring 60 is mounted adjacent to ring 36. Ring 60 has a hole 61 and a pair of pins 62 that extend from ring 60 toward ring 70. Ring 60 also has a pair of slots 63 that are located on an outer edge. Pins 39 are located in slots 63 after assembly. An aperture 64 is located adjacent each slot 63. A web 65 is located between the aperture 64 and slot 63. Web 65 and aperture 64 form a spring 82. Rotor or ring 70 has an upper surface 70A and a lower surface 70B. Ring 70 is mounted adjacent to ring 60. A hole 71 is located in ring 70. A pair of slots 73 are located on an inner edge adjacent hole 71. Pins 62 are located in slots 73 after assembly. An aperture 74 is located adjacent each slot 73. A web 75 is located between the aperture 74 and slot 73. Web 75 and aperture 74 also form a spring 82. An upper carrier or ring 32 has a hole 33 and splines 34 that face hole 33. Ring 32 is mounted adjacent rotor 70. Rings 32, 36, 60 and 70 would be injection molded out of a plastic material.

An upper shaft 44 has a bore 47 (not shown) and a lower shaft 48 has a bore 50. In the center of the shaft, a conventional torsion bar 52 is used to connect shafts 44 and 48 together. Splines 53 on torsion bar 52 mate with inner splines 51 on shafts 44 and 48. Upper shaft 44 has outer splines 46 that mate with splines 34 on upper ring 32. Similarly, lower shaft 48 has outer splines 49 that mate with splines 38 on lower ring 32. Therefore, shaft 44 is rotationally connected to upper carrier 32 and shaft 48 is rotationally connected to lower carrier 36. After assembly, shaft 44 passes through hole 33 and shaft 48 passes through holes 37, 61 and 71. Shafts 44, 48 and torsion bar 52 are preferably formed from steel.

The torsion bar 52 transmits the load between the two shafts and allows flexing or twisting to allow relative angular displacement of the shafts in proportion to the amount of torque placed on the shafts. In an automotive application, shaft 48 can be a steering wheel shaft that connects to a steering wheel and shaft 44 can be a steering linkage shaft that connects to a steering linkage gear box. The amount of difference in rotational displacement of shaft 44 and 48 is proportional to the magnitude of torque being applied to the steering wheel.

After assembly, all four rings 32, 36, 60 and 70 are located adjacent each other. Pin 39 is located in slot 63 and pin 62 is located in slot 73 to form pin-slot pairs 80 (FIG. 4). Pins 39 and 62 are biased or pressed on by spring 82.

Operation

The eccentricity compensator 30 allows a torque sensor and shafts 44 and 48 to rotate and perform properly when the axes of rotation of shafts 44 and 48 are either slightly non co-axial or offset and also when the axes of rotation are co-axial or offset.

Eccentricity compensator 30 prevents wear induced relative rotational displacement in the compensator as follows:

When shafts 44 and 48 rotate in a non-co-axial manner, pins 39 and 62 move slightly in slots 63 and 73 as the rings pivot slightly and as they slide. This causes wear between pins 39, 62 and slots 63, 73. The springs 82 cause the wear to occur in such a manner as to not cause the rings to rotate relative to each other. FIG. 4 shows the original position of pins 39 in slots 63 as is indicated by line 84 with an axis of rotation 88. As the pins and slots wear the positions of the pins and slots will be offset or shift as indicated by wear position line 86. The wear is forced by the spring loaded pins to occur as a shift in position between the rings instead of a rotational difference between the relative rotational positions of the rings. Therefore, the hysteresis and the resulting hysteresis angle of the prior art are eliminated and wear induced angular shift is eliminated. Eccentricity compensator 30 allows a torque sensor to have accurate and correct torque readings over the life of the torque sensor as it wears.

One of ordinary skill in the art of designing and using sensors will realize many advantages from studying and using the preferred embodiment. For example, the eccentricity compensator is readily made at a low cost and uses few parts. Another advantage is that eccentricity compensator can be used between any two rotating objects that have non-coaxial axes of rotation or have axes of rotation that are slightly offset. The invention provides a robust cost effective solution to the problems of the prior art.

Alternative Embodiment

Figure 5:
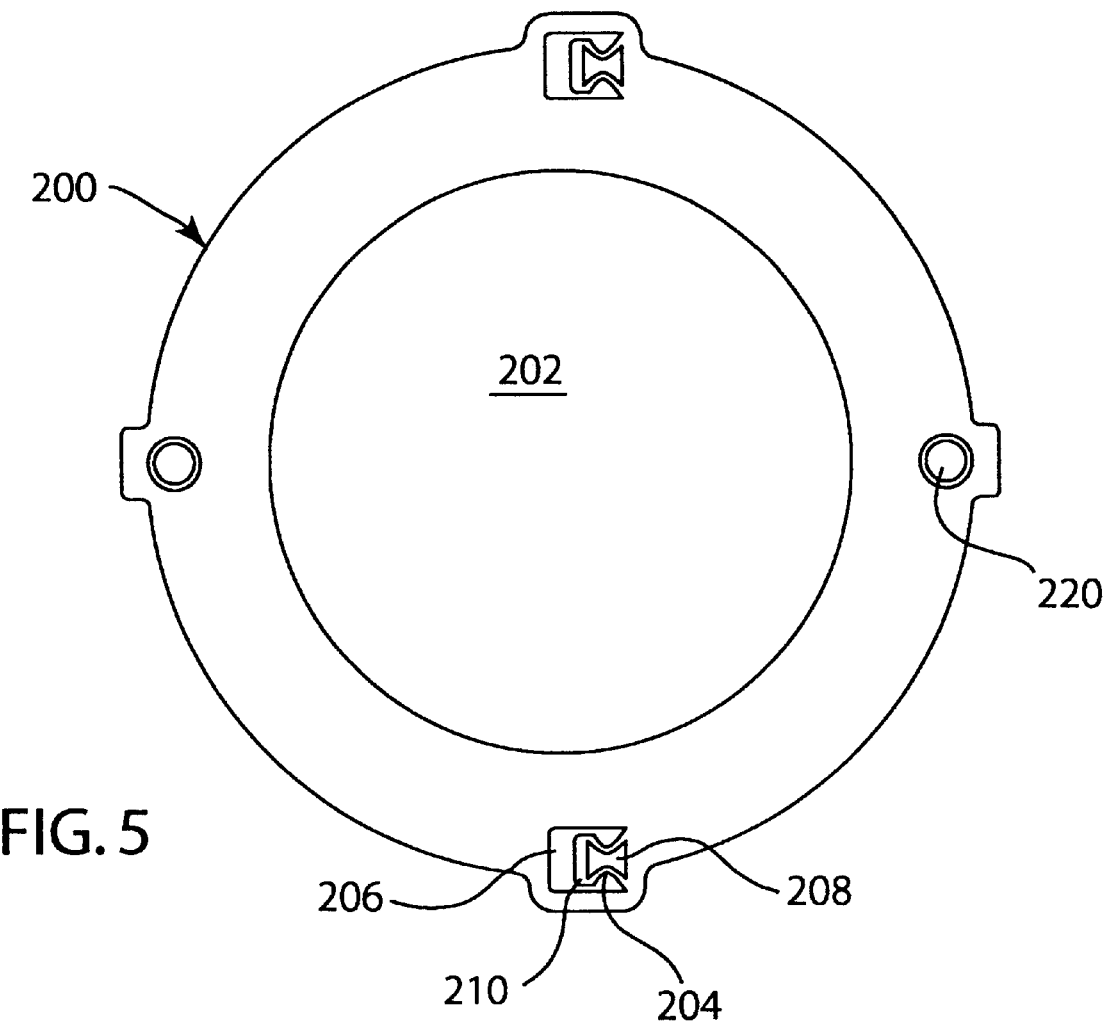
FIG. 5 is a perspective view of an alternative embodiment of the present invention.
Figure 6:
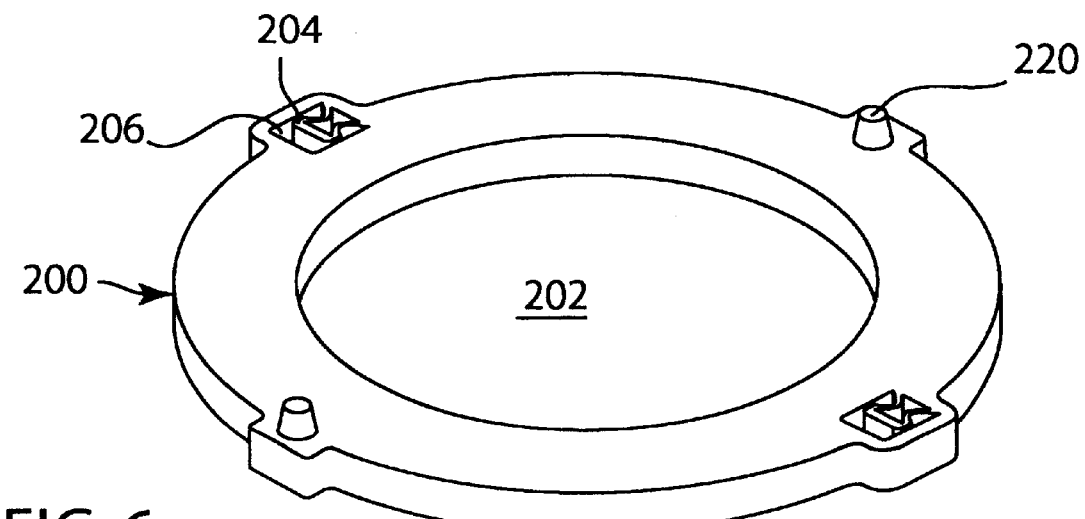
FIG. 6 is a top view of FIG. 5.

Referring to FIGS. 5 and 6, there is an alternative embodiment of ring 60 shown. Ring 200 has a hole 202 and a pair of anvil springs 204 molded into ring 200. Anvil springs 204 have an aperture 208 and a wall 210. A slot 206 is located next to each anvil spring 204. The pins 39 of ring 36 are located in slots 206 after assembly. Anvil springs 204 perform the same function as spring 82 in biasing the pins. Wall 210 is in contact with and biases pin 39. A pair of pins 220 extend away from ring 200. Pins 220 would mate with slots 73 of ring 70.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. An eccentricity compensator for preventing rotational error between a first and second rotating shaft, the compensator mounted between the first and second rotating shaft that are joined by a torsion bar, the compensator comprising:

a) a first ring attachable to the first shaft, the first ring having at least one first pin extending therefrom;
   b) a second ring located adjacent the first ring, the second ring including:
      b1) at least one second pin extending from the ring;
      b2) at least one first slot located on an outer circumference of the second ring, the first pin located in the first slot;

b3) at least one first aperture located adjacent the first slot; and c) a third ring attachable to the second shaft, the third ring located adjacent the second ring, the third ring having at least one second slot and at least one second aperture, the second pin located in the second slot;

d) a spring mounted adjacent the second slot, the spring biasing the second pin such that wear induced relative rotation between the rings is prevented.

2. The eccentricity compensator according to claim 1, wherein the rotating shafts are a steering column of a vehicle.

3. An eccentricity compensator for preventing rotational difference between a first and a second rotating shaft that are joined by a torsion bar, comprising:

a) a first ring attachable to the first shaft;

b) a second ring located adjacent the first ring;

c) a third ring attachable to the second shaft, the third ring located adjacent the second ring;

d) at least one pin-slot pair disposed between any two of the first, second or third rings; and e) a spring mounted adjacent the pin-slot pair, the spring biasing the pin-slot pair such that wear induced rotational difference between the second and third rings is prevented.

4. The eccentricity compensator according to claim 3, wherein the spring is an aperture and web located in the rings.

5. The eccentricity compensator according to claim 3, wherein the pins extend from the rings.

6. The eccentricity compensator according to claim 3 wherein the slots are located in the rings.

7. The eccentricity compensator according to claim 4 wherein the web is elastically deformed when the pin is slid into the slot, the elastically deformed web providing the bias on the pin.

8. An eccentricity compensator mounted to a rotating shaft having an internal torsion bar, comprising:

a) a first ring mounted around the shaft;

b) a second ring located adjacent the first ring and mounted around the shaft;

c) a third ring located adjacent the second ring and mounted around the shaft;

d) a plurality of pins extending from at least two of the first, second or third rings;

e) a plurality of slots located in at least two of the first, second or third rings, the pins mounted into the slots; and f) a spring mounted adjacent each slot, the spring biasing the pin such that wear induced relative rotation between the rings is prevented.

9. The eccentricity compensator according to claim 8, wherein the spring biases the pin so as to prevent wear induced rotational displacement between the second and third rings.

10. The eccentricity compensator according to claim 8, wherein the spring biases the pin so as to prevent wear induced rotational displacement between the first and second rings.

11. The eccentricity compensator according to claim 8, wherein the spring is an aperture and web located in the rings.

12. The eccentricity compensator according to claim 11 wherein the web is elastically deformed when the pin is slid into the slot, the elastically deformed web providing the bias on the pin.

13. The eccentricity compensator according to claim 8, wherein the rotating shaft has a first shaft and a second shaft, the torsion bar mounted between the first and second shafts, the first ring mounted to the first shaft.

14. The eccentricity compensator according to claim 13, wherein the rotating shafts are a steering column of a vehicle and the rings are mounted to a torque sensor.

15. The eccentricity compensator according to claim 13 wherein the second shaft is mounted to a fourth ring, the fourth ring mounted adjacent the third ring.

16. The eccentricity compensator according to claim 15 wherein the first and second shafts are mounted to the first and fourth rings by splines.

17. A method of preventing wear induced relative displacement in a torque sensor, the torque sensor mounted between a first and second non-coaxial rotating shaft that are joined by a torsion bar, comprising:

a) providing a first ring mounted around the first shaft, a second ring located adjacent the first ring and mounted around the first shaft, a third ring located adjacent the second ring and mounted around the shaft, a plurality of pins extending from either the first, second or third rings, a plurality of slots located in either the first, second or third rings, the pins mounted into the slots;

b) allowing the shafts and the rings to rotate together; and c) biasing the pins using a spring mounted adjacent each slot, the spring biasing the pins in a non-rotational direction such that wear induced relative rotation between the rings is prevented.

18. A device for preventing rotational displacement comprising:

a) a first and a second rotating shaft that are joined by a torsion bar;

b) an eccentricity compensator attachable between the first and second shafts, the eccentricity compensator being adapted to allow the first and second shafts to rotate with non-coaxial axes of rotation; and c) a spring mechanism mounted to the eccentricity compensator, the spring mechanism being adapted to rotationally bias the eccentricity compensator such that wear induced rotational displacement is prevented in the eccentricity compensator.

\* \* \* \* \*